(12) United States Patent
Tabatabai et al.

(10) Patent No.: US 10,946,342 B2
(45) Date of Patent: Mar. 16, 2021

(54) DYNAMIC COATING OF MF/UF MEMBRANES FOR FOULING MITIGATION

(71) Applicant: King Abdullah University of Science and Technology, Thuwal (SA)

(72) Inventors: S. Assiyeh Alizadeh Tabatabai, Thuwal (SA); TorOve Leiknes, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 188 days.

(21) Appl. No.: 15/737,497

(22) PCT Filed: Jul. 13, 2016

(86) PCT No.: PCT/IB2016/054188
§ 371 (c)(1),
(2) Date: Dec. 18, 2017

(87) PCT Pub. No.: WO2017/009792
PCT Pub. Date: Jan. 19, 2017

(65) Prior Publication Data
US 2018/0169586 A1    Jun. 21, 2018

Related U.S. Application Data

(60) Provisional application No. 62/191,619, filed on Jul. 13, 2015.

(51) Int. Cl.
*B01D 65/08* (2006.01)
*B01D 67/00* (2006.01)
(Continued)

(52) U.S. Cl.
CPC ............. *B01D 65/08* (2013.01); *B01D 65/02* (2013.01); *B01D 67/0088* (2013.01);
(Continued)

(58) Field of Classification Search
CPC ........ B01D 65/08; B01D 65/02; B01D 71/76; B01D 71/028; B01D 71/024; B01D 69/14;
(Continued)

(56) References Cited

U.S. PATENT DOCUMENTS 8,829,062 B1    9/2014 Minko
9,517,438 B2 *  12/2016 Miller .................... B01D 71/10
2014/0231351 A1  8/2014 Wickramasinghe

FOREIGN PATENT DOCUMENTS

JP    2011152544    8/2011
WO   WO2008137663  11/2008
WO   WO2012151197  11/2012

OTHER PUBLICATIONS

Smith et al., Functionalized nanoparticles as removable membrane coatings, 2013, American Chemical Society, pp. 189-203. (Year: 2013).*

(Continued)

*Primary Examiner* — David C Mellon
(74) *Attorney, Agent, or Firm* — Patent Portfolio Builders PLLC

(57) ABSTRACT

A membrane system including an anti-fouling layer and a method of applying an anti-fouling layer to a membrane surface are provided. In an embodiment, the surface is a microfiltration (MF) or an ultrafiltration (UF) membrane surface. The anti-fouling layer can include a stimuli responsive layer and a dynamic protective layer applied over the stimuli responsive layer that can be a coating on a surface of the membrane. The stimuli responsive polymer layer can act as an adhesive prior to coating with the dynamic protective layer to aid in adhering the dynamic protective layer to the membrane surface. The dynamic protective layer can be formed by suitable nanoparticles that can prevent adhesion of foulants directly to the membrane surface. The stimuli (Continued)

responsive layer can be responsive to physio-chemical stimuli to cause a release of the stimuli responsive layer and the dynamic protective layer including foulants from the membrane.

10 Claims, 1 Drawing Sheet

(51) Int. Cl.
| | |
|---|---|
| *B01D 65/02* | (2006.01) |
| *B01D 69/02* | (2006.01) |
| *B01D 69/12* | (2006.01) |
| *B01D 69/14* | (2006.01) |
| *B01D 71/02* | (2006.01) |
| *B01D 71/76* | (2006.01) |
| *B01D 61/14* | (2006.01) |

(52) U.S. Cl.
CPC .............. *B01D 69/02* (2013.01); *B01D 69/12* (2013.01); *B01D 69/14* (2013.01); *B01D 71/024* (2013.01); *B01D 71/028* (2013.01); *B01D 71/76* (2013.01); *B01D 61/145* (2013.01); *B01D 61/147* (2013.01); *B01D 2321/04* (2013.01); *B01D 2321/08* (2013.01); *B01D 2321/28* (2013.01); *B01D 2321/32* (2013.01); *B01D 2323/46* (2013.01)

(58) Field of Classification Search
CPC .... B01D 69/12; B01D 69/02; B01D 67/0088; B01D 2321/32; B01D 2321/08; B01D 2323/46; B01D 2321/28; B01D 61/147; B01D 61/145; B01D 2321/04; B01D 71/022; B01D 71/02; B01D 71/025; B01D 71/027; B01D 37/02; B01D 67/0006; B01D 67/0004; B01D 67/0041; B01D 67/0044; B01D 67/0046; B01D 67/0048; B01D 67/0081; B01D 67/0079; B01D 67/0083; B01D 67/0093
See application file for complete search history.

(56) References Cited

OTHER PUBLICATIONS

International Search Report dated Sep. 16, 2016, issued in International Application No. PCT/IB2016/054188.
Written Opinion of the International Searching Authority dated Sep. 16, 2016 issued in International Application No. PCT/IB2016/054188.
Meng, Tao, et al.; "A thermo-responsive affinity membrane with nano-structured pores and grafted poly(N-isopropylacrylamide) surface layer for hydrophobic adsorption;" Journal of Membrane Science; 349 (2010) 258-267.
Frost, S., et al; "Thermoresponsive ultrafiltration membrane for the switchable transport and fractionation of nanoparticles;" Procedia Engineering 44 (2012) 49-50.
Communication pursuant to Article 94(3) EPC in corresponding/related EP Application No. 16741147.9, dated Apr. 15, 2020 (Documents D1-D4 were cited in the IDS filed Mar. 27, 2018).
Communication pursuant to Article 94(3) EPC in corresponding/related EP Application No. 16741147.9, dated Sep. 4, 2020 (Documents D1-D4 were cited in the IDS filed Mar. 27, 2018).

* cited by examiner

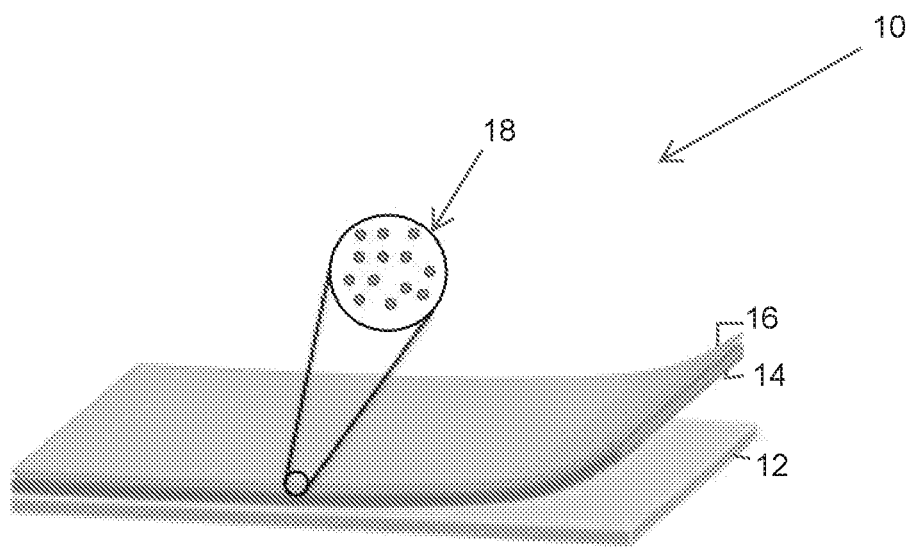

DYNAMIC COATING OF MF/UF MEMBRANES FOR FOULING MITIGATION

CROSS-REFERENCE TO RELATED APPLICATIONS

This application is the National Stage of International Application No. PCT/IB2016/054188, filed Jul. 13, 2016, which claims the benefit of and priority to U.S. Provisional Application Ser. No. 62/191,619, having the title "DYNAMIC COATING OF MF/UF MEMBRANES FOR FOULING MITIGATION," filed on Jul. 13, 2015, the disclosure of which is incorporated herein in by reference in its entirety.

TECHNICAL FIELD

The present disclosure generally relates to coatings for microfiltration (MF) and ultrafiltration (UF) membranes to mitigate fouling of the membranes, in particular to reduce fouling and enhance cleaning efficiency.

BACKGROUND

Microfiltration (MF) and Ultrafiltration (UF) are low pressure or vacuum membrane filtration processes that are typically used for pathogen and suspended solids removal. MF/UF membrane processes have gained wide acceptance in the drinking water industry because of their ability to produce high-quality and consistent product water. More recently MF/UF membrane filtration has gained acceptance as a pretreatment for nanofiltration (NF) and reverse osmosis (RO) for surface water and seawater applications.

Fouling of MF/UF membranes can occur due to the accumulation of (in) organic colloids, organic macromolecules, etc. on the surface or within the pores of the membranes. Fouling results in reduced membrane productivity, higher operational cost, and shorter membrane lifetime.

Thus microfiltration (MF) and Ultrafiltration (UF) membranes require regular cleaning to maintain system performance and membrane life. Unlike spiral wound reverse osmosis (RO) membranes which are ideally designed around a quarterly cleaning schedule, MF and UF systems are cleaned much more frequently. To mitigate costs, the industry commonly uses generic chemicals including: an acid (such as citric acid, hydrochloric acid or other acid solution), a hypochlorite (an oxidant), and/or a caustic. For example, an acid solution may be used to remove scalants. Oxidants maybe used to remove biological and/or inorganic foulants, if the membrane material is tolerant of oxidants. Caustic solutions may be used to remove organics. Within certain limits, a wide variety of UF/MF membranes are generally compatible with these products and cleaning results can be satisfactory.

Generic solutions do not always succeed in returning the membranes to design performance values and this is where perceived cost References and Approvals Guide savings using generics is negated. This has led to the development of more effective cleaners specifically for UF/MF membranes. These specialty formulations can be applied in place of generic chemicals or used as a periodic 'recovery cleaner' between generic cleanings.

Each membrane type, however, has specific limitations as it pertains to acceptable pH ranges, chlorine exposure, and other critical data. For this reason, it can be important to review the membrane manufacturer's limits and the technical data sheets for compatibility prior to use. There continues to be a need for better ways to reduce fouling and increase cleaning efficiency of MF/UF membranes.

SUMMARY

The global water treatment business (e.g. sewerage works, seawater desalination, wastewater treatment) is expected to expand from around $450 billion in 2010 to a $700 billion market in 2025. Membrane technology is becoming an increasingly important segment in this business. World demand for membranes is expected to rise from around $16.5 billion to $25.7 billion in 2017 (ca. 9.2% yearly), where water treatment will remain the top market. Fouling is an issue that impacts all of these markets. Any system that can enhance membrane filtration performance through enhanced fouling mitigation techniques will subsequently fulfill a large market need.

Provided herein is an approach to reducing fouling of MF/UF membranes during filtration and which enhances cleaning efficiency. In various aspects, methods and membrane systems are provided to reduce membrane fouling. The methods and membrane systems are well suited to be an integral part of fouling mitigation in membrane processes. They can maximize cleaning procedures and cycles in order to reduce costs and control water production. In addition to fouling mitigation, the methods and systems also can be designed for removal of specific compounds in the feed water. The methods and systems can be used in any membrane filtration system, e.g. MF/UF pretreatment systems, MF/UF systems in drinking water treatment, MBR technology in wastewater treatment, oil field produced water treatment with ceramic or polymeric membranes, etc. The methods and systems are particularly suitable for use with low-pressure membrane technology. They can be used with MF/UF membranes. The membranes can have a hollow fiber, tubular or capillary configuration. The membrane configuration can include single- or multi-bore capillaries.

In an embodiment, a method of applying an anti-fouling layer to a membrane surface is provided. The surface can be of a microfiltration (MF) or an ultrafiltration (UF) membrane surface. The anti-fouling layer can include a stimuli responsive layer and a dynamic protective layer applied over the stimuli responsive layer. In one or more aspects, the anti-fouling layer can be a coating on a surface of the membrane.

In one or more aspects, the method can include applying a stimuli responsive polymer to the surface of the membranes subsequently followed by applying a dynamic protective layer coating over the stimuli responsive polymer layer. The stimuli responsive polymer layer can act as an adhesive prior to coating with the dynamic protective layer to aid in adhering the dynamic protective layer to the membrane surface. The dynamic protective layer can be formed by suitable nanoparticles (e.g., iron hydroxy-oxides). A coating of the nanoparticles can be applied to the stimuli responsive polymer layer. The nanoparticle coating can create a dynamic layer preventing adhesion of foulants directly to the membrane surface. The adhesive properties of the stimuli responsive layer (e.g., polymers) can subsequently be "turned off" during cleaning, for example a regular or chemically enhanced backwash, increasing the cleaning efficiency by allowing release and removal of the dynamic protective layer with entrapped foulants.

The present fouling mitigation strategy can be suitable for any commercially available MF/UF membrane, including hollow fiber membranes (single or multiple capillaries) using an inside-out or outside-in configuration. Common membrane materials include polysulfone (PS), polyethersulfone (PES), polyvinylidene difluoride (PVDF). The stimuli responsive layer (e.g., adhesive) can be applicable to the most commonly used types of membranes. Our method can also be adapted to be used with ceramic MF membranes.

In an embodiment, a method of applying an anti-fouling layer to a surface of a membrane within a fluid system is provided comprising the steps of: a) providing a membrane surface; b) applying a stimuli responsive layer to the membrane surface; and c) applying a dynamic protective layer over the stimuli responsive layer thereby forming a membrane system including the anti-fouling layer comprised of the stimuli responsive layer and the dynamic protective layer. In any one or more aspects, the fluid system can be an aqueous based system. The stimuli responsive layer can be applied to the membrane surface as a part of a liquid feed to the membrane surface within the fluid system, the dynamic protective layer can be subsequently applied to the stimuli responsive layer as a part of a liquid feed to the membrane surface. One or more foulants can be captured within liquid system by the nanoparticles of the dynamic protective layer. Stimuli can be applied to the stimuli protective layer to release the nanoparticles from the membrane system and the nanoparticles flushed away from the membrane system.

In an embodiment, the present disclosure provides a membrane system. The membrane system can comprise: a) a membrane surface; b) a stimuli responsive layer applied to the membrane surface; and c) a dynamic protective layer over the stimuli responsive layer.

In any one or more aspects of any one or more embodiments, the membrane can be a microfiltration or an ultrafiltration membrane. The stimuli responsive layer can be comprised of a material acting as an adhesive to aid in adhering the dynamic protective layer to the membrane surface, for example a stimuli responsive polymer. The stimuli responsive layer can be responsive to at least one of pH, temperature, light, a solvent, a surfactant or a micelle to reduce the adhesive character of the stimuli responsive layer causing a reduction in the adhesive character of the stimuli responsive layer and causing release or removal of the dynamic protective layer from the surface of the membrane system. A stimuli can be applied to the stimuli responsive layer by changing at least one of the pH, the temperature or the light within the fluid system and/or adding a solvent, a surfactant, or a micelle to the fluid system thereby. The stimuli responsive layer can be selected from the group consisting of synthetic polymers, organic polymers and polyelectrolytes. The dynamic protective layer can be formed of nanoparticles smaller than 1 μm. The dynamic protective layer can be formed of nanoparticles selected form the group consisting of mineral precipitates, zeolites, metal oxides, metal hydroxides and metal oxide-hydroxides. The dynamic protective layer can be formed of reactive nanoparticles. The dynamic protective layer can be formed of a material having a property selected from the group consisting of adsorptive, ion exchange, redox, induced catalytic, and induced complexation properties. The dynamic protective layer can be formed of nanoparticles comprised of mineral precipitates, zeolites (such as zeolites with ion exchange capabilities), metal oxides, etc.

Other systems, methods, features, and advantages of the present disclosure, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 depicts a non-limiting example of our dynamic coating for a filtration membrane.

DETAILED DESCRIPTION

Described below are various embodiments of the present systems and methods for dynamic coating of microfiltration (MF) and ultrafiltration (UF) membranes for fouling mitigation. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

DISCUSSION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic inorganic chemistry, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DESCRIPTION

Described herein are various embodiments of systems and methods providing a novel anti-fouling layer deposited on a membrane, for example on a surface of a membrane. The membrane can be a low pressure membrane. The membrane can include various membrane technologies, such as microfiltration (MF) and ultrafiltration (UF) membranes. The membrane can include MF/UF membranes, enhancing membrane filtration suitable for the separation processes in which the membranes may be used. The membrane can have a hollow fiber, tubular and/or capillary configuration. The membrane configuration can include single- or multi-bore capillaries. In various aspects, the anti-fouling layer can mitigate fouling of the membrane and increase cleaning efficiency of the membrane.

In an embodiment, the anti-fouling layer can include a stimuli responsive layer deposited on a surface of the membrane, and a dynamic protective layer deposited over the stimuli responsive layer. The stimuli responsive layer can be removable from the surface of the filtration membrane in response to physico-chemical stimuli applied to the stimuli responsive layer and/or the application of the physico-chemical stimuli can diminish or "turn off" the adhesive property of the stimuli responsive layer, allowing release or removal of the dynamic protective layer from the membrane coated with the anti-fouling layer.

In one or more aspects, the dynamic layer can be formed of nanoparticles. The nanoparticles can be smaller than 1 μm, for example within the range of 100-200 nm. The nanoparticles can be added to feed water at any point during filtration of the feed water. It can be advantageous, however, to add the nanoparticles during the start of a filtration cycle to prevent adhesion of foulants to the membrane surface. Using the stimuli responsive layer can facilitate deposition of a uniform dynamic protective layer. The size of the nanoparticles may affect the uniform deposition of the nanoparticles over the stimuli responsive layer.

The dynamic protective layer can be formed by suitable nanoparticles. In one or more aspects the nanoparticles that can be used to create the dynamic protective layer can in principle be in the submicron range as that allows for the in situ formation of a uniform layer along capillaries in MF/UF membranes. The choice of material may be dependent on the target compounds to be removed. The dynamic protective layer can also be formed using more sophisticated nanoparticles, for example nanoparticles having or functionalized to have a reactive property or characteristic. In various aspects, by "reactive" we mean that the nanoparticles can contain adsorptive, ion exchange, redox, induced catalytic and/or complexation properties. Such materials can include but are not limited to mineral precipitates and zeolites (such as zeolites with ion exchange capabilities). Such materials can also include metal oxides, metal hydroxides, metal oxide-hydroxides, etc. The metal can be, for example selected from Groups 3 to 12 of the Periodic Table of Elements, aluminum and magnesium. In various aspects the metal can be selected from silver, copper, zinc, manganese, platinum, palladium, gold, barium, aluminum, iron and mixtures thereof. In particular, iron can be iron II or iron III. The metal-oxide hydroxide can include iron-oxide hydroxide (also referred to as iron hydroxy-oxide). For example, iron hydroxy-oxide nanoparticles are suitable due to simplicity of formation.

By applying nanoparticles having reactive properties, removal of constituents from the water phase not removed in MF/UF filtration can also be achieved. We call this layer "dynamic" because it can be formed and removed at any time during the operation of MF/UF membranes (in situ). The layer can also be called dynamic as it potentially interacts/reacts with the feed water constituents (foulants).

The protective anti-fouling layer can also represent an integrated removal process coupled with protection and anti-fouling properties. Depending on the nature and properties of the nanoparticles, recovery and regeneration following a cleaning cycle enabling reuse of the nanoparticles is possible. The dynamic protective layer coating as defined herein can include tailored nanoparticles with multiple functions, forming a removable protective anti-fouling layer on the membrane with a removal capacity for target constituents in the water as a function of the nanoparticle properties.

The stimuli responsive layer can be formed of a stimuli responsive polymer (SRP). Stimuli-responsive polymers (SRPs) are smart materials which can show noticeable changes in their properties with environmental stimulus variations. The specific stimuli responsive polymer can be removed or released from the membrane surface by physico-chemical means, and it does not adversely affect the filtration performance of the membrane. For example, removal may be accomplished during a backwash cycle. The stimuli responsive material can be based on or include synthetic or organic polymers (carbohydrates, proteins, etc.), polyelectrolytes, etc. which are responsive to various stimuli e.g., pH, temperature (thermally responsive), solvent, surfactants, micelles, light, etc. Examples of suitable SRP's are provided in Tables 1 and 2 below.

TABLE 1

Examples Of Smart Polymers and Respective Stimuli They're Responding.

| Type of Stimulus | Polymers |
| --- | --- |
| pH | Dendrimers |
| | Poly(L-lisine) Ester |
| | Poly(hidroxyproline) |
| | Lactose-PEG grafted poly (L-lysine) nanoparticle |
| | Poly(propyl acrylic acid) |
| | Poly(ethacrylic acid) |
| | Carbopol ® |
| | Polysilamine |
| | Eudragit ® S-100 |
| | Eudragit ® L-100 |
| | Chitosan |
| | PMAA-PEG copolymer |
| Organic solvent | Eudragit ® S-100 |
| Temperature | PNIPAAm |
| | Poloxamers |
| | Prolastin |
| Magnetic field | PNIPAAm hydrogels containing ferromagnetic material PNIPAAm-co-acrylamide |
| Electical signals | Chitosan |
| Ions | Sodium alginate ($Ca^{2+}$) |
| | Chitosan ($Mg^{2+}$) |
| Photosensitive | PEG |
| | Poly(lactic acid) |

TABLE 2

Examples Of Smart Polymers Which Respond To More Than One Stimuli.

| Type Of Stimulus | Polymers |
| --- | --- |
| $Ca^{2+}$ And Peg | Carboxymethyl Celulose |
| $Ca^{2+}$ And Temperatue | Eudragit ® S-100 |
| $Ca^{2+}$ And Acetonitrile | Eudragit ® S-100 |
| Ph And Temperature | Poly(N-Acryloyl-N-Propyl Piperazine) |
| Light And Temperature | Poly(Vinyl Alcohol)-Graft-Poly-Acrylamide-Triphenylmethane Leucocyanide Derivatives |

In particular, examples of suitable thermo-responsive polymers include the poly(N-substituted acrylamide) polymers' family, in which have a special reference to the polymers poly(N-isopoprylacrilamide)(PNIPAAm), poly (N,N'-diethyl acrylamide), poly (dimethylaminoethyl methacrylate and poly (N-(L)-(1-hydroxymethyl) propyl methacrylamide). Other examples of thermo-responsive polymers are: copolymers blocks of poly(ethylene glycol)/poly (lactide-co-glicolide) (PEG/PLGA, Regel®), polyoxyethylene polyoxypropylene (PEO/PPO), triple blocks of copolymers polyoxyethylene-polyoxypropylene-polyoxyethylene (PEO-PPO-PEO) and poly(ethylene glycol)-poly(lactic acid)-poly(ethyleneglycol) (PEG-PLA-PEG), BSTGel® from BioSyntech, and ReGel® from Macromed.

Examples of suitable pH-responsive polymers include: polyacrylamide (PAAm), poly(acrylic acid) (PAA) (Carbopol®) and derivatives, poly(methacrylic acid) (PMAA), poly(2-diethylaminoethyl methacrylate) (PDEAEMA), poly (ethyleneimine), poly(L-lysine), poly(N,N-dimethylaminoethylmethacrylate) (PDMAEMA), Eudragit L® and Eudragit S® from Röhm Pharma GmBH (with methacrylic acid and metylmetacrylate in their composition), CMEC (a cellulose derivative) from Freund Sangyo Co., CAP by Wako Pure Chemicals Ltd., HP-50 and ASM by Shin-Etsu Chemical Co., Ltd. There are also several natural polymers (for example, albumine, gelatin and chitosan) that present pH sensibility. Chitosan is a cationic amino polysaccharide, derivative from chitin.

The operation of our anti-fouling mitigation layer can be as follows; the stimuli responsive layer, such as an adhesive polymer, can be filtered onto the surface of the membrane (i.e. priming of the membrane). This can be done, for example, after a regular or chemically enhanced backwashing cycle is completed. This can be followed by deposition of the dynamic protective layer. The dynamic protective layer can be deposited as a uniform coating layer of nanoparticles on the surface of the stimuli responsive layer. The stimuli responsive layer (e.g., polymer) can secure (adhere) the dynamic protective layer (e.g., nanoparticles) to the membrane surface. In an aspect the stimuli responsive layer can act as a primer for the dynamic protective layer. The dynamic protective nanoparticle layer can capture system foulants. Depending on the choice of nanoparticles, this can include removal of targeted constituents (e.g. through adsorptive, ion exchange, redox, or induced catalytic or complexation properties). At the beginning of the next backwash cycle the adhesive nature of the stimuli responsive layer can be "switched off" or "turned off" allowing easy removal of the fouled dynamic layer. The stimuli responsive layer can be switched off by flushing or backwashing the membrane system (including the membrane, the stimuli responsive layer and the dynamic protective layer) with a liquid or solution having a pH, temperature, one or more surfactants and/or micelles, or by changing the light in the system, to reduce the adhesive property or character of the stimuli responsive layer and thereby promote release of the dynamic protective layer from the system.

The principle is illustrated in the FIG. 1. For the appropriate nanoparticle, recovery of the removed material and regeneration prior to being reapplied can be accomplished. FIG. 1 depicts an embodiment of a membrane system 10 of the present disclosure including a dynamic coating of the present disclosure. The system includes a membrane 12, such as a microfiltration (MF) or an ultrafiltration (UF) membrane. A stimuli responsive layer 14, such as the aforementioned stimuli responsive layer, is deposited or formed on the membrane 12. A dynamic protective layer 16, such as the aforementioned dynamic protective layer, is deposited or formed over the stimuli responsive layer 14. The dynamic protective layer can include nanoparticles 18. The stimuli responsive layer 14 and the dynamic protective layer 16 form an anti-fouling layer for the membrane 12. Application of a stimuli, such as a physico-chemical stimuli (e.g., pH, temperature, or application of solvent, surfactant and/or micelles) can cause or promote a release of the stimuli responsive layer 14, including the dynamic protective layer 16 deposited on the stimuli responsive layer, from the membrane 12 and thereby releasing the anti-fouling layer from the membrane.

Work has shown that depositing a layer of iron hydroxy-oxide nanoparticles on the surface of MF/UF hollow fibers at the start of a filtration cycle can enhance the efficiency of hydraulic cleaning, when high loads of organic matter were present in the feed water (Tabatabai, 2014, PhD thesis). In this approach, particle size was selected to ensure that the iron nanoparticles uniformly cover the membrane surface. A challenge can be the control of the deposition layer both in coverage and thickness. Control of coverage and thickness can be a function of the particle size distribution of the nanoparticles, their properties, and interaction with the membrane. Controlling particle size allows for uniform deposition and adding a stimuli responsive material ensures that the dynamic layer is secured on the membrane surface.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Therefore, the following is claimed:

1. A method of applying an anti-fouling layer to a membrane surface of a membrane within a fluid system comprising the steps of:
    providing the membrane surface;
    applying a stimuli responsive layer to the membrane surface; and
    applying a dynamic protective layer over the stimuli responsive layer, the dynamic protective layer formed of nanoparticles smaller than 1 μm thereby forming a membrane system including the anti-fouling layer comprised of the stimuli responsive layer and the dynamic protective layer on at least part of the membrane surface,
    wherein the stimuli responsive layer is responsive to a stimuli including a temperature, a light, a surfactant, or a micelle,
    wherein the stimuli responsive layer is comprised of a stimuli responsive polymer material acting as an adhesive to aid in adhering the dynamic protective layer to the membrane surface,
    wherein the stimuli causes a reduction in an adhesive character of the stimuli responsive layer and causes release or removal of the dynamic protective layer from a membrane system in which the membrane surface is arranged, and
    wherein the dynamic protective layer is formed of a material having a property selected from the group consisting of ion exchange, redox, induced catalytic, and induced complexation properties.

2. The method of claim 1, wherein the membrane is a microfiltration or an ultrafiltration membrane.

3. The method of claim 1, further including:
    applying the stimuli to the stimuli responsive layer by changing, the temperature or the light within the fluid system and/or adding the surfactant, or the micelle to the fluid system.

4. The method of claim 3, wherein the stimuli responsive layer is applied to the membrane surface as a part of a liquid feed to the membrane surface within the fluid system, the dynamic protective layer is subsequently applied to the stimuli responsive layer as a part of a liquid feed to the membrane surface, capturing one or more foulants within the fluid system with the nanoparticles of the dynamic protective layer, then applying the stimuli to the stimuli protective layer to release the nanoparticles form the membrane system and flushing the nanoparticles away from the membrane system.

5. The method of claim 1, wherein the stimuli responsive layer is selected from the group consisting of synthetic polymers, organic polymers and polyelectrolytes.

6. The method of claim 1, wherein the dynamic protective layer is formed of nanoparticles selected from the group consisting of mineral precipitates, zeolites, metal oxides, metal hydroxides and metal oxide-hydroxides.

7. A membrane system comprising:
    a membrane having a membrane surface;
    a stimuli responsive layer applied to the membrane surface; and
    a dynamic protective layer over the stimuli responsive layer, the dynamic protective layer formed of nanoparticles smaller than 1 μm,
    wherein the stimuli responsive layer is responsive to a stimuli including a temperature, a light, a surfactant, or a micelle, the stimuli responsive layer is comprised of a stimuli responsive polymer material selected to act as an adhesive to aid in adhering the dynamic protective layer over the membrane surface, and the stimuli causes a reduction in the adhesive character of the stimuli responsive layer and causes release or removal of the dynamic protective layer from the membrane surface, and
    wherein the dynamic protective layer is formed of nanoparticles having a property selected from the group consisting of ion exchange, redox, induced catalytic, and induced complexation properties.

8. The membrane system of claim 7, wherein the membrane is a microfiltration or an ultrafiltration membrane.

9. The method membrane system of claim 7, wherein the stimuli responsive layer is selected from the group consisting of synthetic polymers, organic polymers and polyelectrolytes.

10. The membrane system of claim 7, wherein the dynamic protective layer is formed of nanoparticles selected from the group consisting of mineral precipitates, zeolites, metal oxides, metal hydroxides and metal oxide-hydroxides.

* * * * *